UNITED STATES PATENT OFFICE.

AUGUSTUS W. THORNTON, OF FERNDALE, WASHINGTON.

PROCESS FOR TREATING HONEY.

1,182,116.   Specification of Letters Patent.   Patented May 9, 1916.

No Drawing.   Application filed July 7, 1915. Serial No. 38,457.

*To all whom it may concern:*

Be it known that I, AUGUSTUS W. THORNTON, a citizen of the United States, residing at Ferndale, in the county of Whatcom and State of Washington, have invented certain new and useful Improvements in Processes for Treating Honey, of which the following is a specification.

This invention relates to the class of food preparations and more particularly relates to a process for treating or preparing honey to evolve a wholesome and tasteful article of diet.

As a principal object, it is contemplated by this invention to subject pure comb honey to a treatment which includes exposing the honey to a low temperature causing it to become granulated and, accordingly, capable of being packed, shipped and kept some length of time before consumption without the otherwise attendant waste and loss by leakage.

An object of equal importance with the foregoing is to provide a process whereby comb honey may be granulated by freezing or exposure to low temperatures and later cut up or separated into individual portions adapted to be disposed of by sale in gross lots.

The above and additional objects are accomplished by the process to be immediately set forth. As a first requisite it is necessary that the honey be as pure as possible. The inventor has discovered that the exposure of pure honey to low temperatures reduces the article to practically a granularly solid state and it is this property which is employed in the present process.

The comb honey, in the form originally acquired, is exposed to a zero degree of temperature, approximately, and for a period of at least forty-eight hours. At the expiration of this period the honey has attained a cheesy consistency and may then be sliced or cut. If the cutting is attempted when the honey is in its normal state the large proportion of fluid honey surrounding and filling the cellular comb structure is subject to waste by leakage, as well as materially increasing the difficulty in handling and consuming the cut portions. The cutting is preferably accomplished by a knife composed of parallel blades intersected at right angles by a second series of parallel blades. This composite knife is sunk into each mass of frozen honey which is separated into cubes thereby. It has been found that each of the cubes is practically a solid piece with smooth-cut edges. Since various masses of the frozen honey, which may be procured from different sources, are rarely of a standard consistency and weight, it will be apparent that cubes of different sizes may be cut from combs varying in quality and such cubes be classified or graded according to preferred standards based on the marketable values of the cubes. It is preferable that grading of the honey be undertaken both in the comb form before the freezing operation and in the cut form after cubing. As the next step in the process the cubes are placed upon wire strainers and any liquid honey remaining in those cells severed by the knife is allowed to drain away into suitable receptacles before the cubes are packed. When the cubes have been completely drained and inspected as to quality according to the fixed grades mentioned, each cube is wrapped in wax paper or a similar covering protective against leaks and placed in a suitable individual container upon which the weight of the cubes should be properly inscribed. These filled containers are then assembled into dozen or gross lots which are then packed in suitable cartons for shipping and storing purposes. It has been discovered that a cube of honey thus frozen and drained will keep for months in merely cool temperatures and will not return to its original semi-liquid condition, nor will it lose its original sweetness of taste. If stored in a refrigerator the cubes may be kept indefinitely in the iced state in which it is packed.

All of the honey cubes which do not come up to the standard of minimum size, weight or quality, together with the salvaged drippings from the draining of the cubes previously mentioned may be separately packaged in glass containers and shipped as a by-product of the main process for producing the frozen honey cubes.

While in the foregoing, however, there has been thus set forth the preferred steps of the honey treating process comprehended by the present invention it is desired to emphasize the fact that such minor changes may be made in reductions of the process to practice as will be comprehended by the scope of the appended claims.

What is claimed is:—

1. The herein described process of treating honey which consists in subjecting the honey in the comb to a low temperature until the honey has attained a semi-solid consistency, and then packaging separately each portion treated.

2. The herein described process of treating honey which consists in subjecting the honey in the comb to a temperature below normal until the honey has attained a semisolid consistency, then dividing this mass into a plurality of individual portions and afterward wrapping each individual portion in a protective covering.

3. The herein described process of treating honey which consists in subjecting the honey in the comb to a temperature below normal until the honey has attained a semisolid consistency, then dividing the hardened mass into a number of individual portions, draining the said portions and finally wrapping each portion in a protective covering.

4. The process of treating honey which comprises the steps of freezing the honey in the comb, dividing the frozen honey into individual portions and packaging such portions separately.

5. The process of treating honey which comprises the steps of freezing the honey in the comb, dividing the frozen honey into individual portions, draining the portions and then inclosing each portion in a protective wrapper.

6. The process of treating honey which comprises the steps of subjecting the honey in the comb to a low temperature, dividing the frozen honey into a number of separate portions, grading said portions according to standards of size, weight or quality, providing each portion with a protective covering, and packaging said portions in multiple lots.

7. The process of treating honey which comprises the steps of freezing honey in the comb, dividing the frozen mass into a plurality of individual portions, draining said portions, then grading the same according to standards of size, weight and quality, inclosing each portion in a protective covering and packaging said portions in multiple lots.

8. The process of treating honey which comprises the steps of subjecting the honey in the comb to a low temperature, grading the frozen combs, dividing each comb into a number of separate portions, wrapping each portion in an individual fluid-tight covering and packaging said covered portions in multiple lots.

9. The process of treating honey which comprises the steps of freezing honey in the comb, cutting the frozen honey into individual portions, draining said portions and grading the same according to size, wrapping each of said portions of the proper size in waterproof paper, and packaging the drained honey and unwrapped portions by mass.

In testimony whereof I affix my signature in presence of two witnesses.

AUGUSTUS W. THORNTON.

Witnesses:
CHARLES PEHRSON,
CHAS. EARHART.